US007719529B2

(12) United States Patent
Anderson et al.

(10) Patent No.: US 7,719,529 B2
(45) Date of Patent: May 18, 2010

(54) PHASE-TOLERANT PIXEL RENDERING OF HIGH-RESOLUTION ANALOG VIDEO

(75) Inventors: Bruce M. Anderson, Albuquerque, NM (US); Kevin W. Blietz, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1201 days.

(21) Appl. No.: 10/952,329

(22) Filed: Sep. 28, 2004

(65) Prior Publication Data

US 2006/0066593 A1 Mar. 30, 2006

(51) Int. Cl.
*G06F 3/038* (2006.01)

(52) U.S. Cl. .................................. 345/213; 348/505

(58) Field of Classification Search ........... 345/87-100, 345/204, 211-213; 348/500, 505, 521, 524, 348/536-541

See application file for complete search history.

(56) References Cited

U.S. PATENT DOCUMENTS 4,797,730 A * 1/1989 Smith ......................... 348/539
5,767,916 A * 6/1998 West .......................... 348/537
5,859,671 A * 1/1999 Kim ........................... 348/537
6,317,005 B1 11/2001 Morel et al.
6,323,910 B1 11/2001 Clark, III
6,975,362 B2 * 12/2005 Sani et al. ................... 348/446
7,236,163 B2 * 6/2007 Yoo ........................... 345/213

FOREIGN PATENT DOCUMENTS

JP 11 109935 A 4/1999

OTHER PUBLICATIONS

International Search Report for PCT/US2005/035150 Dated Dec. 27, 2006.

* cited by examiner

*Primary Examiner*—Jimmy H Nguyen
(74) *Attorney, Agent, or Firm*—Ingrassia Fisher & Lorenz, P.C.

(57) ABSTRACT

Methods for recovering high-resolution images from an analog video interface by autonomously correcting for phase errors between a synchronized clock signal to a sampling analog-to-digital converter and the input video signal. A global phase adjustment first detects video transitions in the sampled video data stream in order to determine and then select the optimum clock phase over entire video frames for rendering the pixels of the video input. This corrects for long-term phase errors, such as those from timing tolerances in circuit components and timing tolerances in the video input. A local phase adjustment selects the samples used for rendering individual pixels according to an algorithm that avoids the selection of samples that may be located within video transition regions. This corrects for short-term phase errors, such as those from jitter and phase drift on the sample clock.

23 Claims, 6 Drawing Sheets

PHASE-TOLERANT PIXEL RENDERING OF HIGH-RESOLUTION ANALOG VIDEO

UNITED STATES GOVERNMENT RIGHTS

The United States Government has acquire certain rights in this invention through Government Contract No. F33657-02-C-2001 awarded by the Department of the Air Force.

BACKGROUND OF THE INVENTION

1. Field of the Invention (Technical Field)

The present invention relates generally to the field of rendering the luminance values for the pixels of a display from an analog video signal. More specifically, the present invention relates to techniques for correctly rendering display pixels from an analog source for a high-resolution image without compromising the image resolution and without introducing dynamic display anomalies.

2. Background Art

Although analog interfaces have traditionally been employed for transmitting video to display systems, the quality of high-resolution images, particularly of computer-generated images, can be degraded when transmitted over an analog interface. Although image quality can be preserved by employing a digital interface, an analog interface is often required or preferred for reasons of cost and/or compatibility.

In order to display images from an analog video signal on a flat-panel display, such as an AMLCD-based display, the analog video input must be periodically sampled and converted into digital values with an Analog-to-Digital (A-to-D) converter circuit. The clock input to the A-to-D converter is generated from a Phase-Locked-Loop (PLL) circuit that synchronizes this clock to the horizontal synchronization signal in the analog video input. The video input is generally passed through an analog low-pass filter prior to the A-to-D conversion in order to attenuate higher frequency components in the video signal. Sometimes a low-pass digital FIR filter is also employed on the sampled digital data stream to further limit the spatial bandwidth of the displayed image. Although such a limitation in the spatial bandwidth may be acceptable when displaying images from some video sources, this can significantly reduce the sharpness of the displayed image.

Analog interfaces have recently been employed to display high-resolution computer-generated images. In these applications the video signal includes legitimate high-frequency components, including edges with transitions in brightness and/or color that occur over the distance of a single pixel or that may be precisely aligned with the boundary between adjacent pixels. An attenuation of these higher frequencies then compromises image quality by extending the spatial regions over which these video transitions occur.

It is theoretically possible to recover a high-resolution image from an analog input by deriving the amplitude level for each pixel of the input signal with a single sample from the A-to-D converter. Ideally, each of these samples would then occur very near the center of the time-period during which the video amplitude level is stable for the input pixel, but this requires a precise and consistent timing alignment between the sampling clock and the analog video input. However, the individual circuit components in the PLL have unit-to-unit variations in their propagation delay times, additional variations with temperature, and changes that result from the aging of the components over their lifetime. All of these tolerances can combine to cause a significant misalignment between the phase of the sampling clock and the video input. The video input has a specified time-delay from horizontal sync to the start of the first pixel, and this time-delay must, of course, also include a tolerance. Moreover, the sampling clock generated by the PLL circuitry also has inherent jitter and an inherent phase drift over the horizontal cycle time.

The combination of all these tolerances can result in a phase error between the input video signal and the sampling clock that is large enough so that a pixel could be rendered by a sample that occurs during the transition time between pixels, instead of during the stable time-period of the pixel. If the jitter on the sampling clock is then comparable in magnitude to the video transition time (i.e., to the signal rise and fall times), a pixel could be rendered with significantly different values on different display refresh cycles. This can result in very objectionable dynamic artifacts whereby individual pixels, and groups of pixels, will periodically change their brightness level and/or their color as the phase relationship between the video input and the sampling clock changes. Although the severity of these dynamic display artifacts could be reduced by low-pass filtering, it has already been noted that this would lower image quality by decreasing image sharpness.

A variable delay can be included in the circuit path of one of the two inputs to the phase comparator of the PLL circuit (or it can be put in series with the sample clock) in order to adjust the average phase offset between the input video signal and the sample clock. This adjustment could correct for long-term phase errors, such as out-of-tolerance components, but not for short-term phase changes, such as jitter and drift on the sample clock. A variable delay circuit can be implemented, for example, by passing a signal through a low-pass filter (to increase the rise and fall time) followed by an analog comparator circuit. By changing the value of a threshold voltage at the other input to the comparator, the delay time of a signal transition through this circuit can be adjusted, thereby controlling the phase offset between the sample clock and the video input.

U.S. Pat. No. 6,317,005 (Morel et al.) shows a variable delay in the horizontal sync input to the phase detector of a PLL (designated in their FIG. 8 as a "LAG CIRCUIT") in order to adjust the phase of the A-to-D sample clock by means of a feedback loop that detects the relative phase of the video transitions. As previously noted, this approach only provides for an adjustment of the average phase offset over the long term and it does not address the issues of phase jitter and drift on the sample clock. The Morel invention also employs a mix of both analog and digital in the circuit path of the feedback loop, and the analog components contribute to a significant tolerance range on the resulting, albeit controlled, phase offset. Thus, for applications that require a precise phase alignment, this circuit may require a calibration procedure.

U.S. Pat. No. 6,323,910 (Clark) employs a "delay generator" circuit, but it does not use this to adjust the phase of the sample clock. The Clark invention does not address the issues of aligning the phase of the sample clock to the input pixels of the analog video signal or of achieving any specific phase alignment to the horizontal sync. Instead, it discloses a method for achieving a consistent phase alignment to the horizontal sync over the multiple horizontal cycles of the video signal.

A circuit that would accurately render high-resolution images from an analog video signal without introducing dynamic display artifacts and that would automatically adjust for both short-term and long-term phase errors between the sample clock and the video input would be of great benefit. It would also be beneficial if this circuit did not require any calibration adjustments. It would be of additional benefit if this were an exclusively digital circuit instead of a mix of analog and digital, as this would provide a more cost-effective circuit.

SUMMARY OF THE INVENTION (DISCLOSURE OF THE INVENTION)

An objective of the current invention is to accurately and consistently render the pixels of a high-resolution image from an analog video input. A further objective is the autonomous real-time correction of phase errors between the video input and the clock signal used for sampling the video input. An additional objective is a circuit that will not require a calibration adjustment because of the unit-to-unit variances in the parameters of the circuit components. Another objective is an implementation that employs exclusively digital circuitry. These and other objectives and advantages of the invention will be apparent to those skilled in the art.

The present invention is for methods that can be implemented with digital circuitry to process the digitized samples of an analog video input so as to accurately and consistently render the individual luminance values for the pixels of a high-resolution image. The invention comprises two fundamental methods for rendering each pixel of the video input (or each color component of each pixel) with, generally, a single digitized sample of the analog input. These methods are designated herein as a "global phase adjustment algorithm" and a "local phase adjustment algorithm." They can eliminate, or reduce the probability of, dynamic display anomalies by avoiding the use of samples that occur during the transition times between the input pixels. Although a given design could employ either one of these algorithms by itself, the algorithms are complementary and were developed to work in concert.

It should be understood that the descriptions of the invention herein make use of specific embodiments of the algorithms, whereas these two fundamental algorithms can actually have significant variations in their detailed embodiments in practical implementations of the invention. Also, although the following description is based on the application of the invention to a monochrome analog video signal, the invention can be used for each of the red, green, and blue analog inputs of a color video signal.

The invention employs an A-to-D sampling clock that is used to process analog video and that is generated by a PLL circuit that locks the phase of this clock to the horizontal sync of the video input. The invention employs over-sampling, whereby the frequency of the sampling clock is an integer multiple of the rate of the input pixels in the analog video signal. An integer number of digitized video samples are then generated from a sampling A-to-D converter for each of the input pixels (i.e., one sample for each of the multiple phases of the sampling clock that occur during each pixel time-period). The PLL circuit is designed so that, at nominal timing, a specific clock phase occurs near the center of the stable time-period for each of the input pixels. The video image can be captured by selecting this specific clock phase to render each of the input pixels with the sampled output from the A-to-D converter that occurs on this clock phase. With a sufficiently stable sampling clock, this will result in an accurate and high-quality rendering of the image. But if the relative timing between the input video and the sampling clock becomes misaligned so that the selected clock phase occurs within the transition regions between the pixels, dynamic display anomalies will result.

The global phase adjustment algorithm autonomously selects one of a number of available clock phases for rendering the input pixels. When used by itself, this algorithm selects a single clock phase that is then used to render all of the pixels. However, the algorithm continuously monitors the video signal in order to detect the locations of the video transition regions relative to the available clock phases.

The ideal time for sampling an input pixel is exactly ½ of the pixel time-period from an adjacent transition region (i.e., it is centered precisely between transition regions). Therefore, determining the locations of the transition regions also delineates the ideal locations for sampling the video signal, and hence the ideal clock phase for sampling the pixels. The global phase adjustment algorithm preferably operates over one or more complete video frames to determine the ideal clock phase for sampling the video signal. When the ideal clock phase is determined to be different than the currently selected clock phase, the algorithm can change the selected clock phase for sampling the pixels to this newly determined ideal clock phase. This change in the selected clock phase would preferably occur during the vertical retrace period of the input video signal. Also, hysteresis is employed in the decision for switching the clock phase in order to prevent a relatively rapid periodic switching between two clock phases, as this can generate dynamic display anomalies by periodically shifting the image left and right by the distance of one pixel on the display screen.

The local phase adjustment algorithm renders each display pixel by selecting, generally, a single sample from the A-to-D converter from a group of available samples that occur over a relatively small time window that brackets a "nominally correct time" for sampling the pixel. A preferred embodiment of this algorithm determines the differences in the sampled values between every pair of contiguous samples from the A-to-D converter. The relative magnitudes between all of the contiguous difference values are then compared in order to determine locations within the digitized video sample stream that may be close to a video transition region between two adjacent input pixels. When the result of these magnitude comparisons indicates that the nominally correct sample time for an input pixel may be close to, or within, a video transition region, the pixel is rendered with an alternate nearby sample that is less likely to be located within a video transition region. By avoiding the use of samples that occur during video transition regions, the local phase adjustment algorithm increases the tolerance of the rendering circuit to video timing errors that can generate dynamic anomalies in the rendered display image.

If the local phase adjustment algorithm were used by itself, without the global phase adjustment algorithm, then the nominally correct sample for each pixel would always occur at the same fixed clock phase (i.e., the same fixed clock phase for every video refresh cycle, as well as for all the pixels within a given refresh cycle). When the local phase adjustment algorithm detects that the nominally correct sample for a given pixel might be within a video transition region, it renders the pixel with an alternate sample that is located a slight distance in phase from the nominal sample. In this way, the local phase adjustment algorithm can compensate for relatively small errors in the phase alignment of the video input that can occur over relatively short time durations. For example, it can adjust for jitter in the sample clock and it can adjust for a phase drift in the sample clock that occurs over the horizontal cycle of the video input. Because these types of phase errors occur over a relatively short time-period, they cannot be corrected by the global phase adjustment algorithm. However, the local phase adjustment algorithm can only adjust for phase errors of relatively small magnitudes, whereas the global phase adjustment algorithm can adjust for large phase errors, provided that these phase offset errors are either constant or change only slowly over time. Therefore, the two algorithms of this invention are complementary, and they can be used together to completely eliminate dynamic artifacts in the rendering of a high-resolution image from an analog video input.

BRIEF DESCRIPTION OF THE DRAWINGS

The accompanying figures, in which like reference numerals refer to identical or functionally-similar elements throughout the separate views, and which are incorporated in and form part of the specification, further illustrate the present invention and, together with the detailed description of the invention, serve to explain the principles of the present invention.

DESCRIPTION OF THE PREFERRED EMBODIMENTS

Best Modes for Carrying Out the Invention

Figure 1:
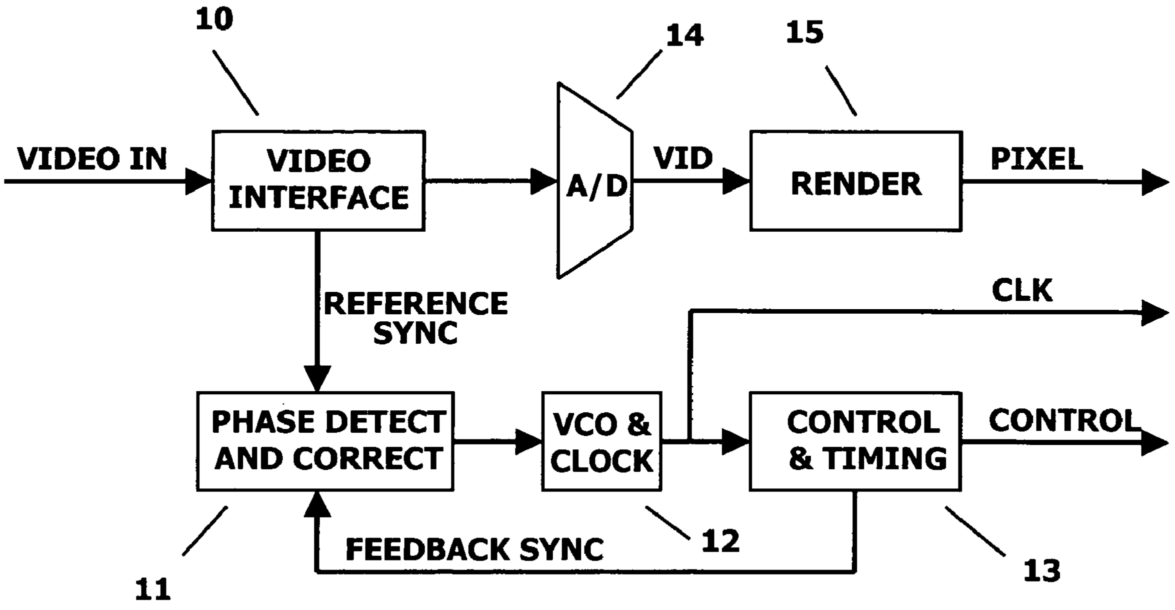
FIG. 1 PRIOR ART
FIG. 1 is a block diagram of a prior-art circuit for rendering the luminance values for the pixels of an image from an analog video input signal.

FIG. 1 is a block diagram of a prior-art circuit that processes an analog video signal to render the luminance values for the pixels of an image. The analog video input could comprise a monochrome composite video signal that incorporates embedded horizontal and vertical synchronization pulses in addition to the analog voltage levels that define the image that is to be displayed. In some systems, separate digital timing signals are used to transmit the horizontal and vertical sync so that the analog input has only the video. A color system may have separate analog video input signals for the red, green, and blue components of the color image with either separate sync inputs or with composite sync on the green video input. This description of the present invention will focus on the application of the invention to a system with monochrome video. However, the invention is equally applicable to color video, and the specific issues that pertain to color systems will also be addressed.

In some systems, the rendered pixel values are used immediately to directly refresh the pixels of a display. However, many systems store the rendered pixel data in a two-dimensional buffer memory to facilitate additional video processing operations, such as a conversion from an interlaced scan at the video input to a progressive scan for refreshing the display. Some systems also perform a re-scaling operation to convert the number of pixels in the input image into the number of pixels in the display. These additional video processing operations are independent of the front-end pixel rendering operation, and they are not addressed in this description of the present invention.

The circuit of FIG. 1 includes a PLL that is comprised of a phase detector 11, a clock generator 12, and control and timing circuitry 13. The clock circuit 12, which would typically employ a Voltage Controlled Oscillator (VCO), generates a clock signal that is used by other parts of the rendering circuit, including the sampling A-to-D converter circuit 14, as well as by any video processing operations that follow the rendering operation. The frequency of the generated clock is typically an integer multiple of the input pixel rate in the analog video input. Thus, the data stream of digitized video samples provided to the render circuit 15 by the A-to-D converter 14 comprises an integer number of samples for every pixel of the input video. The control and timing circuitry 13 includes a divide-by counter that is employed to generate a sync signal that is compatible with the horizontal sync of the video input and is used in a feedback loop to the phase detector 11. The video interface 10 outputs the horizontal sync of the input video signal as a reference sync to the phase detector 11. The phase detector generates an error signal that reflects any phase difference between the reference sync and the feedback sync in order to lock the phase of the VCO to the horizontal sync of the video input. The error signals generated by the phase detector 11 are typically filtered by a charge pump circuit that supplies a voltage input to control the VCO.

If the video input is a composite video signal, the video interface 10 would include circuitry to strip the horizontal and vertical sync signals from the video signal. Although not pertinent to the current invention, the video interface might also incorporate a DC restore and an AGC on the video input signal. Either or both of these functions could also be implemented in the digital domain, but they are not shown in this description of the present invention.

The control and timing circuitry 13 comprises a state machine that is synchronized to the horizontal and vertical synchronization signals of the input video signal in order to generate the control signals that are required by the rest of the circuitry. Some systems can process a number of different video formats (e.g., video signals having a different number of active video lines and/or a different number of pixels per line), and some include circuitry for automatically detecting the input video format and adjusting the timing of generated control signals accordingly. The present invention is compatible with, and can be employed in, such systems.

Figure 2A:
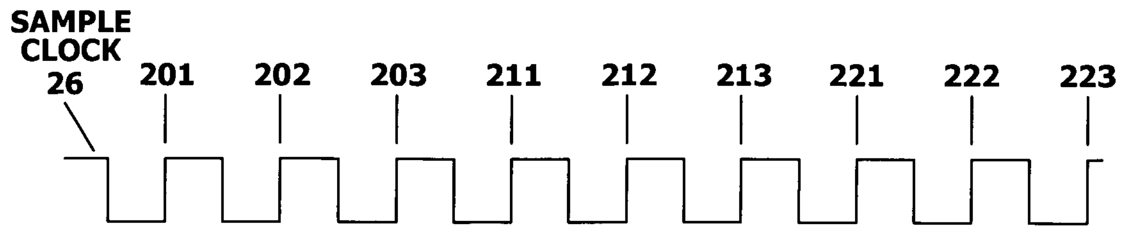
FIG. 2A shows a timing diagram for the clock input to a sampling A-to-D converter circuit for a clock frequency equal to three times the input pixel rate of an analog video input signal.
Figure 2B:
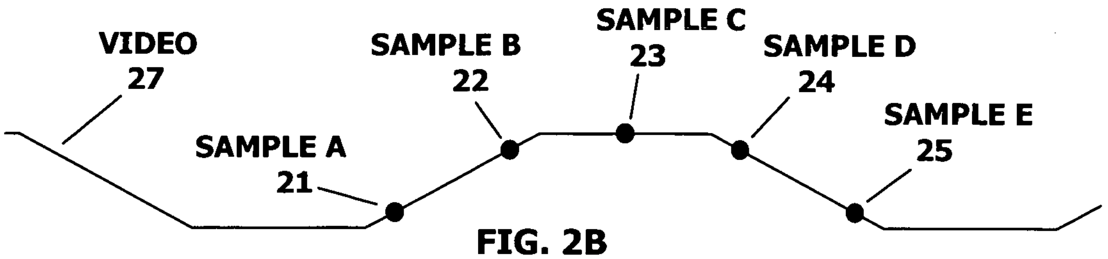
FIG. 2B, FIG. 2C, FIG. 2D, and FIG. 2E show timing diagrams for an analog video input signal at different phase alignments relative to the sampling clock of FIG. 2A.
Figure 2C:
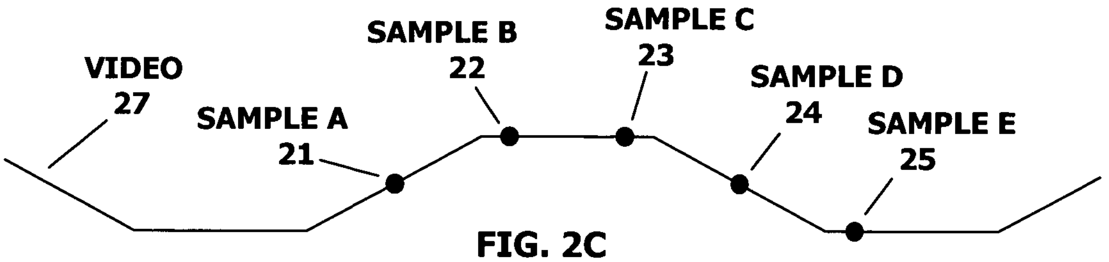
Figure 2D:
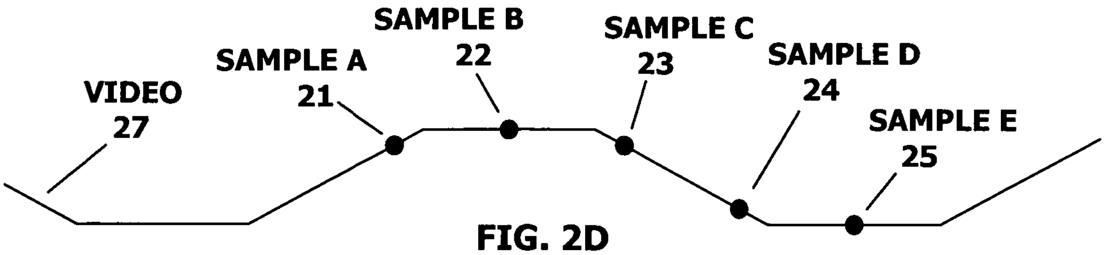
Figure 2E:
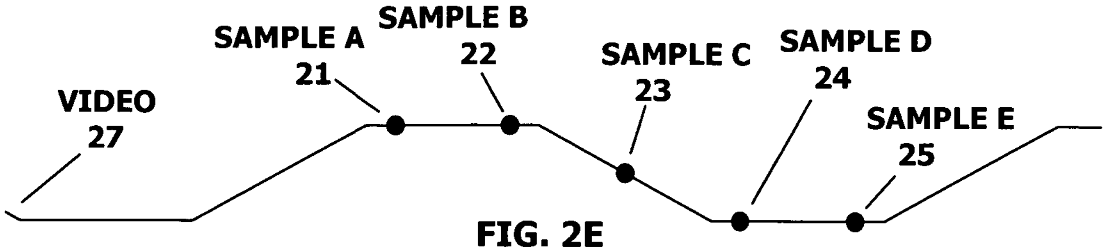

The invention will be described for a preferred embodiment that employs an A-to-D converter that samples the analog video signal at a frequency of three times the input pixel rate. It should be understood, however, that the invention is also compatible with sampling frequencies that are other integer multiples of the input pixel rate. FIG. 2A is a timing diagram for an A-to-D sample clock 26 that operates at three times the frequency of the pixel rate. The A-to-D converter is sampled on the rising edge of this sample clock. FIG. 2B is a timing diagram of the input video signal 27 at the ideal, or nominal, phase alignment with the sampling clock 26. FIG. 2C, FIG. 2D, and FIG. 2E are timing diagrams for the same video signal 27 that show progressively larger phase errors relative to the sample clock 26. Referring to FIG. 2A and FIG. 2B, the video sample that is taken at phase 203 of the clock 26 is designated as Sample A and it is shown as the filled circle 21 on the video signal 27. The locations of the next four samples of the video signal are also shown as filled circles, with Sample B 22 occurring at clock phase 211, Sample C 23 at clock phase 212, Sample D 24 at clock phase 213, and Sample E 25 at clock phase 221. Because of the progressively larger phase error in the video signal 27 relative to the sample clock 26 for the timing diagrams of FIG. 2C through FIG. 2E, the samples in these timing diagrams occur at different phase locations on the input video signal 27 (i.e., at locations on the video signal that reflect the error in the phase of the video signal relative to the sample clock).

The timing diagrams of FIG. 2 show a relatively small window of time for the video input 27. A single bright pixel occurs near the middle of this time-period with black pixels on both sides of this bright, pixel. For the nominal video timing of FIG. 2B, Sample C is precisely in the middle of the stable time-period of this bright input pixel. If this nominal timing could be maintained (i.e., over the entire video refresh cycle, as well as over the long term), then a high-resolution image in this analog input could be correctly displayed by rendering each of the input pixels with a single sample from the A-to-D converter. Every third sample from the A-to-D converter would then be used to render a pixel, with, for example, the sample at clock phase 202 used to render a black pixel, Sample C at clock phase 212 used to render the bright pixel, and the sample at clock phase 222 used to render the next black pixel. This is an approach used in the prior art. FIG. 2C shows the video signal 27 with a phase error equal to −1/6 of the pixel time-period, relative to the sample clock. With this phase error, Sample C would still render the correct value for the bright pixel, since it is still located within the stable voltage period of the input pixel. But with a phase error of −1/3 pixel, as shown in the timing diagram of FIG. 2D, Sample C is located within the transition region between the bright pixel and the following black pixel. Therefore, Sample C would no longer render the correct level for the bright pixel. Moreover, the actual location of Sample C within this transition region would be different on different video refresh cycles because of the inherent jitter in the sampling clock. Therefore, the pixel would be rendered with different values on different refresh cycles, thereby resulting in a dynamic artifact in the displayed image. In the timing diagram of FIG. 2E the video signal has a phase error of −1/2 pixel and Sample C is at the middle of the transition region. This is the worst-case phase error in regard to the severity of dynamic display artifacts. In fact, if the jitter on the sample clock is comparable in magnitude to the video rise and fall times (i.e., to the time duration of the transition region), the rendered pixel value can range from black to the maximum brightness.

The present invention can eliminate the dynamic display artifacts that would normally occur from phase errors in the video signal relative to the A-to-D sample clock. It achieves this by the method of employing a local phase adjustment algorithm and/or a global phase adjustment algorithm. These algorithms will be described by referring to the timing diagrams of FIG. 2.

The local phase adjustment algorithm renders each pixel of the input video signal with a technique that avoids the use of A-to-D samples that are located within a video transition region. This provides a greater tolerance to phase errors before artifacts can occur in the rendered image. And because this algorithm operates independently on each of the rendered pixels, it is able to correct for localized, short-duration phase errors, such as those caused by jitter on the sample clock and phase drift on the sample clock that occurs over the horizontal time-period.

A preferred embodiment of this algorithm determines the difference values between nearby samples from the A-to-D converter and then compares the relative magnitudes of these difference values in order to detect locations of possible video transitions. This information is then used to select one or more samples from the A-to-D converter for rendering a pixel so that this process can avoid the selection of any sample that may be located in a transition region. The algorithm could, for example, select a single sample from the A-to-D converter and then render the pixel with the value of this sample. Alternately, it could select two adjacent samples and render the pixel with the average value of these two samples.

In one preferred embodiment of the local phase adjustment algorithm, each input pixel is rendered with one of three contiguous samples from the A-to-D converter. For example, the bright pixel shown in FIG. 2B is rendered with Sample B, Sample C, or Sample D. For the nominal video timing of FIG. 2B, Sample C is located in the middle of the stable time-period for this pixel, and it would be the preferred sample for rendering the pixel. However, when the algorithm detects that Sample C may be within a video transition region, either Sample B or Sample D, whichever one is closer in value to Sample C, is used to render the pixel.

In order to detect the possible encroachment of a transition region into the nominal sample time, the differences between the values of adjacent samples are determined and then the relative magnitudes of these difference values are compared. If the magnitude of the difference between the sample at the nominal clock phase and an adjacent sample is greater than the magnitude of the difference between that same adjacent sample and its other neighboring sample, this indicates that the nominal sample may be within a transition region. Whenever this occurs, the algorithm renders the pixel with one of the adjacent samples instead of with the sample at the nominal clock phase. Specifically, the adjacent sample that is closest in value to the sample at the nominal clock phase is used to render the pixel. If it is not determined that the sample at the nominal clock phase may be near a transition region, the pixel is rendered with this sample. If the letters A through E are used to denote the values of Sample A through Sample E, respectively, then this embodiment of the algorithm can be expressed by:

IF BOTH: $|A-B|>|B-C|$ AND $|D-E|>|C-D|$,

THEN: PIXEL=C

ELSE: PIXEL=B, OR PIXEL=D,

WHICHEVER ONE IS CLOSER IN VALUE TO C

From the above, it can be seen that the pixel will be correctly rendered with Sample C for the nominal timing of FIG. 2B. However, this embodiment of the invention does not definitively detect that a video transition has actually occurred. This is because only the relative magnitudes of the difference values are compared. For example, if both of the adjacent pixels to the bright pixel located at Sample C of FIG. 2B were also at this same brightness level (i.e., instead of being black), Sample B and Sample D would be at nominally the same level as Sample C. Then very slight and unpredictable variations in the values of these samples would occur due to noise. And because of these variations, the algorithm would render the pixel with different samples on different video refresh cycles. Of course, the algorithm would always render the pixel correctly, since all three of the samples have nominally the same value and any one of the samples will correctly render the pixel. Thus, in the absence of any video transition near the nominally correct sampling time, the algorithm correctly renders the input pixel. And when a video transition does occur, the algorithm is designed to correctly identify the location of this transition.

A critical test of the correct operation of any algorithm is to examine the so-called “corners” of the algorithm, where conditions are precisely at a threshold that determines alternate behaviors. The timing shown in FIG. 2C, where the video signal has a phase error of −1/6 the pixel time-period, is one of the corners for this algorithm. For this timing, the value of |D−E| is equal to the value of |C−D|, and the result of comparing these values will vary on different refresh cycles because of noise. However, this will result in the pixel being rendered with either Sample C or Sample B, and both will correctly render the pixel, since they are at nominally the same correct level. At phase errors of increasingly larger magnitudes, the pixel will be rendered with Sample B. For example, this will be the case for the phase error of −1/3 the pixel time-period, as shown in FIG. 2D. And in this case, the algorithm correctly renders the pixel, whereas the prior-art approach of always using Sample C (i.e., the nominal sample) would result in the wrong value for the pixel and would also generate dynamic artifacts due to the jitter on the sample clock. Thus, the local phase adjustment algorithm has been shown to improve the tolerance to phase errors.

For a phase error of −1/2 the pixel time-period, as shown in FIG. 2E, the algorithm detects that Sample C is within the transition region, and the pixel is rendered with either Sample B or Sample D. However, this choice will be different on different refresh cycles (e.g., due to noise on the video signal and/or due to jitter on the sample clock), and this will result in dynamic artifacts. This is the worst-case phase error for the generation of artifacts, and it is at the tolerance limit of the algorithm. However, it has been shown that the algorithm extends the tolerance range of the rendering operation beyond that of the prior art. Therefore, it can eliminate artifacts in systems where the magnitude of phase errors is limited to this improved tolerance range. For systems that require an even larger tolerance to phase errors, this algorithm can be used with the global phase adjustment algorithm to eliminate dynamic artifacts in systems with very large phase errors.

The global phase adjustment algorithm autonomously selects a single specific clock phase (from the multiple clock phases that are available during each pixel time-period) that is determined to be the optimum phase for rendering the input pixels. It determines this globally selected clock phase according to which phase is the most favorable, on average, over the entire refresh cycle. This determination preferably employs a statistical approach that does not react to the short-term jitter and drift on the sample clock. The algorithm continuously processes the data stream from the A-to-D converter in order to detect the locations of the video transitions relative to the available clock phases. If it determines that the current globally selected clock phase is no longer the optimum phase for rendering the pixels, it changes the globally selected clock phase to this newly determined optimum phase. However, a change in the selected clock phase would preferably occur only during the vertical retrace period of the video signal.

The sample clock 26 in the timing diagram of FIG. 2A has a total of three clock phases available during every pixel time-period, and one of these would be the globally selected clock phase. For example, the expected time window for the bright pixel that is shown at nominal timing in FIG. 2B encompasses clock phases 211, 212, and 213 of the sample clock. One of these would be the globally selected phase, and this phase is, of course, repeated on every third cycle of the sample clock. The present invention will be described by focusing on the example of rendering the specific input pixel that occurs at the nominal timing of the bright pixel of FIG. 2B.

The global phase adjustment algorithm can be embodied in the same way whether it is used alone or used with the local phase adjustment algorithm. When used with prior-art rendering (instead of with the local phase adjustment algorithm) each input pixel can be rendered with a sample from the A-to-D converter that occurs on the globally selected clock phase. Recall that the local phase adjustment algorithm employs a nominal clock phase, but does not always render a given pixel with the sample that occurs at this nominal clock phase. For example, the preferred embodiment that was previously described can render a given pixel with the sample that occurs at the nominal clock phase or with either one of the adjacent samples. When used with the global phase adjustment algorithm, the local phase adjustment algorithm uses the globally selected clock phase as the nominal clock phase.

The global phase adjustment algorithm can be implemented with a cost-effective design that utilizes some of the same hardware employed to implement the local phase adjustment algorithm. The previously described embodiment of the local phase adjustment algorithm includes compare circuitry that determines the difference values between contiguous samples from the A-to-D converter and then compares the relative magnitudes of these difference values. A local peak in the magnitude of the difference values indicates the location of a possible video transition. For example, the magnitude of the difference between samples D and E in FIG. 2B is greater than the magnitude of the difference between samples C and D. It is also greater than the magnitude of the difference between Sample E and the following sample that occurs at phase 222 of the sample clock. Therefore, this local peak in the difference magnitudes indicates that the center of a video transition may be located somewhere between samples D and E. It is clear from FIG. 2B that this is indeed the case. However, the global phase adjustment algorithm must ensure that this peak in the difference magnitudes is the result of a legitimate video transition and not due to noise. This can be implemented by comparing the full magnitude of the video transition over the pixel time-period that brackets the peak difference value against a fixed threshold value. Thus, the magnitude of the difference between Sample C and the sample at phase 222 of the sample clock is compared to this threshold. The threshold value must be large enough to discriminate against noise and detect only legitimate video transitions. Typically, a threshold of around 20% to 25% of the full-scale dynamic range of the video would be more than large enough to meet this requirement.

When a legitimate video transition is detected, the location of this transition is assumed to be at the midpoint between the two samples of the peak difference value. The optimum time for sampling an input pixel is 1/2 the pixel time-period from an adjacent video transition, which is one and a half clock cycles from the video transition. Thus, for the video timing of FIG. 2B and the detected video transition between samples D and E, the optimum time for sampling the depicted bright pixel is at clock phase 212 with the pixel rendered by Sample C.

A preferred embodiment of the global phase adjustment algorithm employs an accumulator for each of the available clock phases. With these accumulators initially cleared, video transitions are detected and the accumulator that corresponds to the optimum rendering phase for each of the detected transitions is incremented until one of the accumulators reaches a predetermined maximum count. The clock phase associated with this accumulator is then determined to be the optimum rendering phase. After this determination, the accumulators are again cleared and this cycle is repeated on a periodic basis so that the globally selected clock phase can be continuously updated in real-time. The value of the maximum count can be set to a large enough number to ensure that a statistically valid sample of detected transitions are accumulated over a period of, preferably, at least one complete refresh cycle of the video input signal. This will, for example, minimize the influence of errors from the short-term jitter on the sample clock. Additionally, a preferred embodiment uses only the first and the last detected video transitions in each horizontal cycle of the video signal for determining the optimum clock phase. This approach minimizes errors caused by phase drift in the sample clock over the horizontal cycle since these errors will then tend to cancel.

For a phase error of −⅙ pixel-time, as shown in FIG. 2C, the midpoint of the video transition that follows the bright pixel occurs at Sample D. Therefore, depending on noise, the midpoint of this transition could be determined to be located between Sample C and Sample D or between Sample D and Sample E. Accordingly, the optimum clock phase would then be determined to be phase 211 (at Sample B) or phase 212 (at Sample C), respectively. However, the embodiment of the global phase adjustment algorithm includes hysteresis in the decision to change the globally selected clock phase. Therefore, if phase 212 (at Sample C) is currently the globally selected clock phase, a change to phase 211 (at Sample B) will not occur for the phase error of −⅙ pixel-time, even when the accumulator for phase 211 is the one to reach the maximum count. Instead, a slightly larger phase error is required before switching to phase 211.

The hysteresis can be implemented by requiring that the value in the accumulator for the currently selected clock phase (in this case phase 212) be less than some predetermined limit value as a condition for changing the globally selected clock phase. As an example, the magnitude of the predetermined limit value could be set to ½ the magnitude of the predetermined maximum count. Statistically, the phase error of −⅙ the pixel time-period, as in the timing diagram of FIG. 2C, will result in nearly equal values in the accumulators of phase 211 and phase 212. In order for the accumulator of phase 211 to reach the maximum count before the accumulator of phase 212 can reach ½ this value, a somewhat larger phase error (that correlates to the amount of hysteresis) would be required. The hysteresis can be adjusted by changing the ratio of the predetermined limit value to the predetermined maximum count (i.e., with a reduction in the predetermined limit value providing an increase in the amount of the hysteresis).

For a phase error of −⅓ the pixel time-period, as shown in FIG. 2D, clock phase 211 would be the globally selected clock phase. When used without the local phase adjustment algorithm, the global phase adjustment algorithm would then correctly render the bright pixel of FIG. 2D with Sample B. And for the phase error of −½ the pixel time-period that is shown in FIG. 2E, the global phase adjustment algorithm would again correctly render this pixel with Sample B. However, this phase error of −½ the pixel time-period is a critical corner for the global phase adjustment algorithm. A phase error of slightly larger magnitude would unambiguously position a detected video transition between Sample B and Sample C, and clock phase 213 (and all like phases, such as 203 and 223) would become the globally selected clock phase. Sample D would then be used to render this pixel of the input image, and it would be rendered as black. The adjacent pixel to the left of this pixel would now be rendered as the bright pixel. Thus, this rather large phase error has shifted the captured input image to the left by one pixel position (i.e., discarding the left-most column of input pixels and adding a column of black pixels on the right). This shifting of the recovered image is the reason that hysteresis is required in the decision for changing the globally selected clock phase. Without this hysteresis, the recovered image could periodically shift back and forth by one pixel position over a relatively short time-period, thereby generating an unacceptable dynamic artifact.

This embodiment of the global phase adjustment algorithm can recover high-resolution images for any phase error while avoiding the generation of dynamic artifacts. As described above, a phase error with a magnitude of approximately ½ the pixel time-period or greater would result in a shifting of the recovered image. A phase error with a magnitude of slightly more than 1.5 times the pixel time-period would, for example, shift the image by two pixels. However, a phase error of such a large magnitude would not occur in practice for most applications. Also, a shift of one or even two pixels in the recovered image would not be an issue for most, if not all, applications.

By employing a larger range of phase adjustment, an alternate embodiment of the global phase adjustment algorithm could avoid a shift in the recovered image due to large phase errors. In this alternate embodiment, the detected locations of the first and last video transitions in the horizontal cycles are compared to the expected/nominal locations for these transitions at the boundaries of the active video period. A first video transition that occurs earlier than the nominal start of active video or a last transition that occurs later than the nominal end of the active video can then be used to determine an absolute phase error. The timing of the sampled video data stream input to the rendering circuit can then be adjusted by an integer number of clock cycles to compensate for this absolute phase error. However, if an input image that has black borders at the horizontal edges, only a relative phase error can be detected (i.e., relative to the available phases of the sample clock). The adjustment range would then be limited to that of the previously described preferred embodiment, and large phase errors would again result in a horizontal shift in the recovered image.

Although either one of the two fundamental algorithms of this invention can be used alone (i.e., without the other algorithm), they are complementary and are designed to work in concert. For example, the local phase adjustment algorithm is limited in regard to the magnitude of phase errors that it can compensate for. However, it has the advantage of being able to make independent phase adjustments for each input pixel, and thereby to adjust for short-term jitter on the sample clock and phase drift in the sample clock over the horizontal cycle. The global phase adjustment algorithm can adjust for a large phase offset error that is consistent over the time duration of a few video refresh cycles or longer, but it can't respond to short-term phase errors.

The amount of hysteresis in the global phase adjustment algorithm should preferably be set to a level that provides the highest overall immunity to dynamic artifacts. To this end, it is useful to test a given circuit for its tolerance to phase errors. A video test pattern with alternating black and bright pixels is ideal for testing dynamic artifacts. The range of tolerance to phase errors can be determined by adjusting the time from horizontal sync to the start of active video in the video signal until artifacts occur (i.e., with all other timing parameters in the video signal at nominal). The tolerance of the pixel rendering circuit can be determined by performing this test with the global phase adjustment disabled. It is known that this tolerance range is less than ±½ the pixel time-period, but the actual range will depend on the jitter and drift on the sample clock. It is generally only the total range of this tolerance that is significant, because the global phase adjustment will compensate for variations in the phase offset of different production units of the same circuit design.

In order to eliminate dynamic artifacts, the global phase adjustment must change the globally selected clock phase within the tolerance range of the pixel rendering circuit. In the absence of hysteresis, the first threshold locations where the globally selected clock phase is changed are located at ±1/6 of the pixel time-period from the nominal timing. However, the magnitude of this threshold is increased by the required hysteresis. The hysteresis can be disabled (e.g., by setting the predetermined limit value equal to the predetermined maximum count) in order to test the size of the phase window (at the threshold region) over which the global clock selection can jump between two clock phases. This test would vary the time from horizontal sync to active video in the video signal while the global clock selection is monitored. The total phase range of the hysteresis must be larger than this measured phase window by the amount of some guard band. With the required hysteresis enabled, the actual threshold locations at which the globally selected clock phase is changed can then be measured. The threshold locations, now greater in magnitude than 1/6 the pixel time-period, must be less than the tolerance of the pixel rendering circuit (again with some guard band) in order to eliminate all dynamic artifacts. Since the local phase adjustment algorithm extends the tolerance range of the pixel rendering beyond the range of the prior art, the use of both algorithms together will provide the highest immunity to dynamic artifacts.

Figure 3:
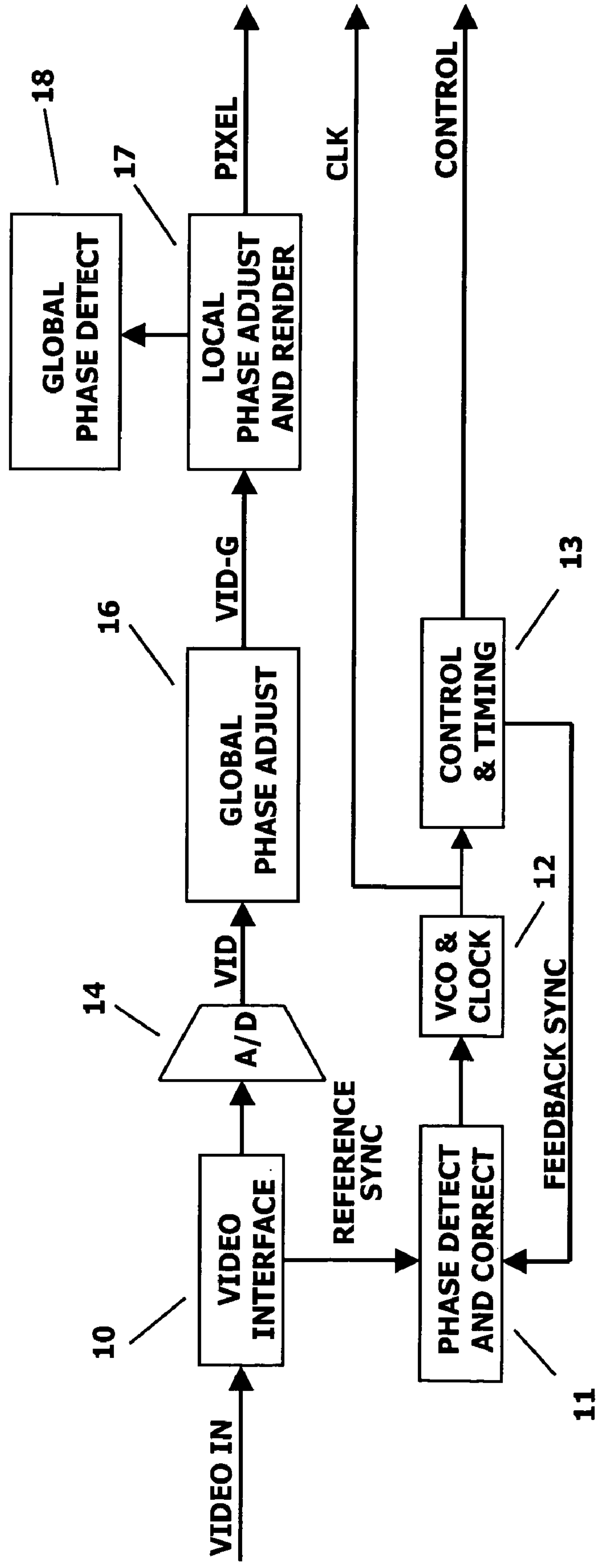
FIG. 3 is the block diagram of a video rendering circuit that depicts a preferred embodiment of the current invention.

FIG. 3 shows a block diagram of a circuit for the described embodiment of the invention. The video interface 10 and the A-to-D converter 14 are the same as in the prior-art circuit of FIG. 1. The phase-locked-loop (comprising the phase detector 11, the clock generator 12, and the control and timing circuitry 13) is also consistent with the prior art. The prior-art rendering circuit 15 has been replaced by a rendering circuit 17 that renders the pixels of the video input according to the local phase adjustment algorithm of the present invention. A global phase adjustment circuit 16 has been interposed between the output of the A-to-D converter 14 and the input to the rendering circuit 17. The global phase detection circuitry 18 processes the digitized video data stream to detect the locations of the video transitions and for this particular embodiment it receives inputs from the local phase adjustment circuit 17.

The embodiment of FIG. 3 compensates for global phase errors by adjusting the timing of the sampled video data stream into the rendering circuit 17. This is implemented by the global phase adjustment circuit 16, which comprises a pipelined delay circuit with an adjustable number of stages. With this approach, the timing of the pixel rendering operation is fixed relative to the internally generated horizontal sync. An alternate approach for implementing the global phase adjustment would be to integrate this function into the control and timing circuitry by providing an adjustment to the timing of the control signals to the rendering operation. With this latter approach, the timing of the data stream into the rendering circuit would be fixed, but the timing of the rendering operation relative to the horizontal sync would then be adjusted to correct for a global phase error.

Figure 4:
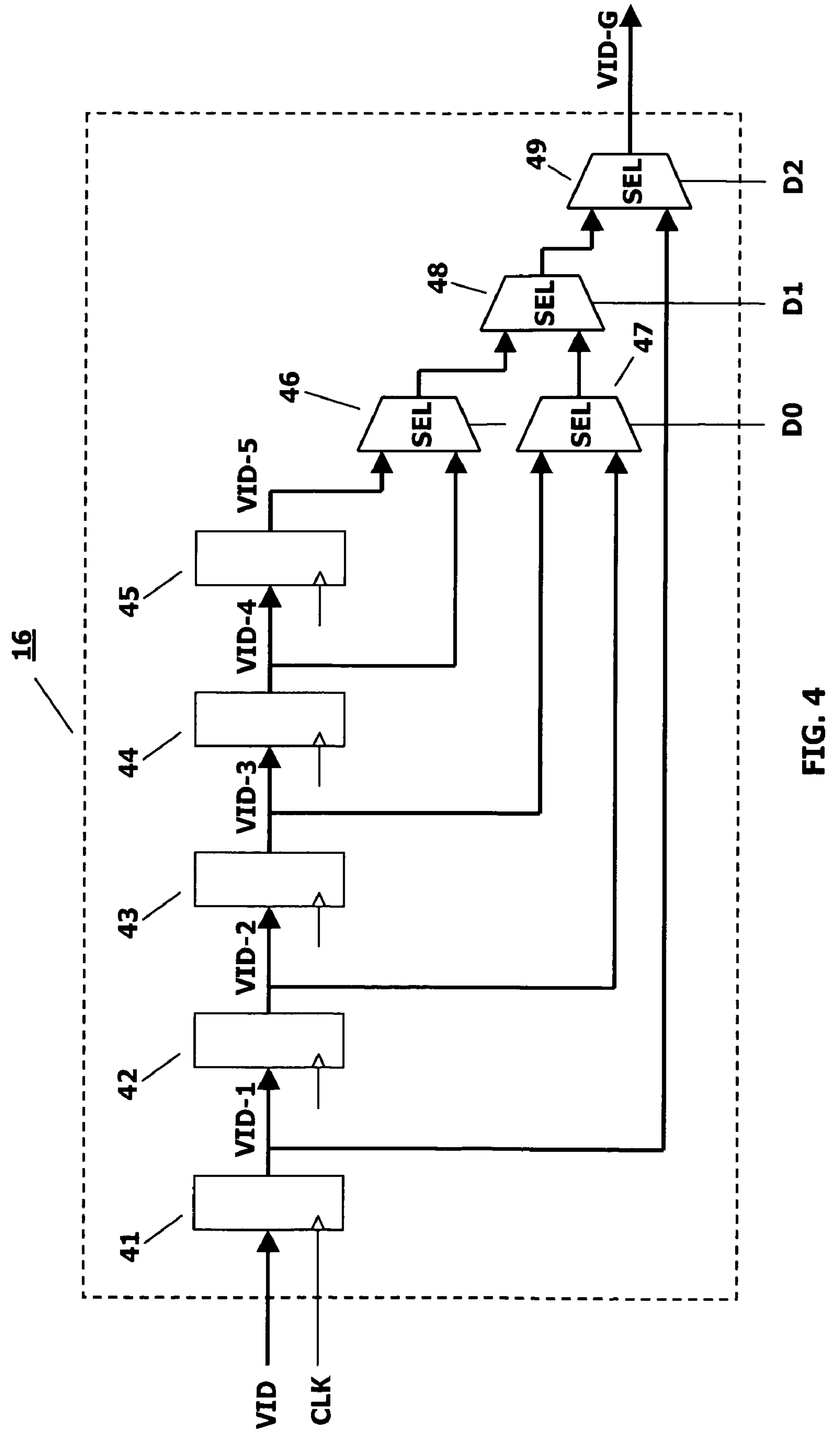
FIG. 4 is a circuit for a preferred embodiment of the global phase adjustment algorithm of the current invention.

The global phase adjustment circuit 16 in FIG. 3 is shown in detail in FIG. 4. It comprises a sequential pipeline of five registers, that are all clocked with the A-to-D sample clock, plus a group of four dual-input selectors that allow any one of the five registers to be selected as the circuit output. A 3-bit control input is used to select one of the five registers, and thereby the delay time of the video data stream through the circuit. In the first rank of selectors, either register 45 or register 44 is output by selector 46, and either register 43 or register 42 is output by selector 47. In the second rank, either the output from selector 46 or the output from selector 47 is output by selector 48. Finally, either the output from selector 48 or the output from register 41 is gated to the output of the circuit by selector 49. For nominal timing, register 43 would be selected as the circuit output. The delay through this circuit can then be optionally increased or decreased by either one or two clock cycles from the nominal delay time.

The preferred embodiment of the global phase adjustment algorithm, as previously described, compensates for global phase errors by selecting between three available clock phases (e.g., between phases 211, 212, or 213 in FIG. 2A). This selection only requires the use of three of the five available delay times in the global phase adjustment circuit 16, and it employs the nominal delay time and the delays of ±1 clock-cycle from the nominal delay. The extended delay range of ±2 clock-cycles has been included in the global phase adjustment circuit 16 for the application of the invention to color video.

Analog color video interfaces can be implemented with three separate analog inputs, one for each of the red, green, and blue color components. Although separate sync signals can be employed, many such interfaces include composite sync on the green video input. When the present invention is used for color video, the monochrome video circuit of FIG. 3 can be used for the green video input. Additional circuits are then required to process the red and the blue video inputs. At minimum, each of these additional circuits comprises a video interface 10, an A-to-D converter 14, a global phase adjustment circuit 16, and a pixel rendering circuit 17 that implements the local phase adjustment algorithm. Depending on the requirements of the specific application, the red and blue video channels might also require global phase detection circuits 18.

An important consideration for color video is that the recovered images for each of the color components must be correctly aligned. For example, if the green input was shifted by one pixel due to a significant phase error, but the red and blue channels were not shifted, this would generate artifacts in the recovered composite image, such as false colors at edges in the image. Fortunately, the phase for the red and blue inputs is usually aligned very closely to the phase of the green input. In some cases the largest contribution to the relative phase tolerance between the separate color signals may be an allowance for a difference in the length of the interfacing cables.

In systems where the specified tolerance for the relative phase difference between the red, green, and blue inputs is small enough, the globally selected clock phase for the green video can also be used for the red and blue inputs. Since each of the independent rendering circuits for the three colors implements the local phase adjustment algorithm, some tolerance is provided for a phase skew between the three color signals. And by using a common globally selected clock phase for all three circuits (in this case based on the optimum phase for the green video channel) the possibility of a single-pixel misalignment between the recovered images is eliminated, provided that the inputs are within their specified relative phase tolerance.

A larger skew in the relative phases of the three color signals can be tolerated by an alternate embodiment that implements additional global phase detection circuits 18 for the red and the blue channels. The globally selected clock phase for the green channel operates independently in the same way as in the previously described embodiments. However, the red and the blue channels must implement a phase correction that is relative to the current globally selected clock phase of the green channel. Specifically, if one of these channels determines that the optimum phase is different from the globally selected clock phase of the green channel, it must use the particular clock cycle of that optimum phase that is adjacent to the globally selected clock of the green channel. This is required so that whenever the green channel makes a change to the globally selected clock phase that results in a one-pixel shift in the recovered green image, the red and blue channels will also shift the recovered images for those channels in synchronization with the green channel. This embodiment of the invention can perhaps be best understood by the use of an example that refers to the timing diagrams of FIG. 2.

Consider a color video input where the timing of the green input is as shown in FIG. 2E and where clock phase 211 (and like phases) is the globally selected clock phase for the green input. The green input pixel for the time window of the bright pixel in the timing diagrams of FIG. 2 would then be rendered by either Sample A or Sample B of FIG. 2E, with Sample B corresponding to the nominal clock phase for the green-channel local phase adjustment circuit. If the red input has the timing shown in FIG. 2D, the global phase detection circuit for the red channel would also select clock phase 211 to be the optimum clock phase for the red video, and the red pixel would be rendered with Sample B of FIG. 2D. But with a slight increase in the magnitude of the phase error on the green video input, the globally selected clock phase for the green video would switch to clock phase 213 and the recovered green image would be shifted by a single pixel (i.e., with the example green pixel now rendered by Sample D or Sample E). Although the optimum clock phase for the red video is not changed, it must implement a phase correction that is relative to the globally selected clock phase of the green video, which has now changed. Therefore, it must now select clock cycle 221 at Sample E for the red video channel because this clock cycle is adjacent to the globally selected clock of the green video and it is the correct phase for the red video (i.e., the clock cycles 211 and 221 being the same phase). This change in the phase correction for the red video will shift the recovered red image so that it will remain correctly aligned with the green image (i.e., with the red pixel now rendered by Sample E of FIG. 2D). This example considered phase errors where the video was early relative to the sample clock. Phase errors of identical magnitude with the video being late relative to the sample clock instead of early would result in the globally selected clock phase for the green video switching from phase 213 to 211 and the nominal sample clock for the red video switching from the clock cycle at Sample D to the clock cycle at Sample A.

The circuit of FIG. 3 is designed to operate at nominal video timing with the delay time through the global phase adjustment circuit 16 set at three clock cycles (i.e., with register 43 as the output). The bright input pixel shown with nominal timing in FIG. 2B would then be rendered according to the local phase adjustment algorithm with clock phase 212 as the nominal clock phase. For the timing of FIG. 2D, where the video signal is early by $\frac{1}{3}$ of the pixel time-period relative to the sample clock (i.e., by one cycle of the sample clock), the global phase detection circuit would determine that clock phase 211 is the optimum clock phase. The global phase adjustment circuit 16 would then be set for a delay of four clock cycles in order to compensate for this phase error. If the video signal is late relative to the sample clock by $\frac{1}{3}$ of the pixel time-period, clock phase 213 would be determined to be the optimum sample time, and the global phase adjustment circuit 16 would be set to a delay of two clock cycles to correct for this phase error. For monochrome video, or the green channel for color video, only these three delay values (i.e., 2, 3, or 4 clock cycles) would be used for the global phase adjustment circuit. For the previously described embodiment for color video, the red and blue video channels must determine their phase adjustment relative to that of the green channel. As was shown for the rendered red pixel of the prior example, this can require that any of the clock cycles 203, 211, 212, 213, or 221 be selected as the nominal clock phase for rendering the pixel. Therefore, the global phase adjustment circuits in the red and blue video channels utilize the full range of their possible delay settings (i.e., one through five clock cycles).

Figure 5:
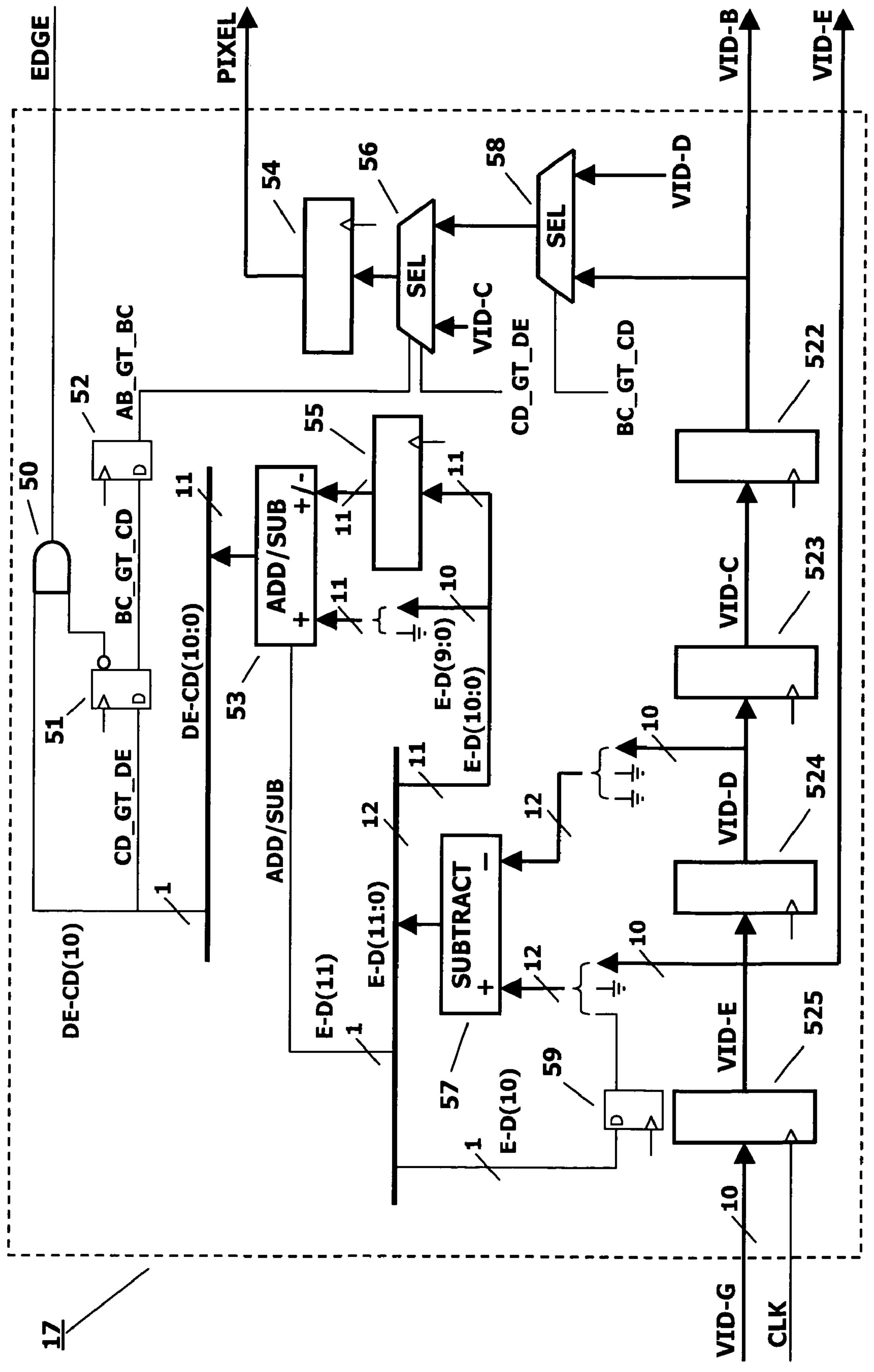
FIG. 5 is a pixel rendering circuit for a preferred embodiment of the local phase adjustment algorithm of the current invention.

The pixel rendering circuit 17 of FIG. 3, which implements the local phase adjustment algorithm, is shown in detail in FIG. 5. It includes a pipeline of the video samples that comprises registers 525, 524, 523, and 522. All of the registers and flip-flops in the circuit are clocked by the A-to-D sample clock. The subtract circuit 57 derives the difference values between all of the adjacent samples in the data stream. Because the video samples are 10-bit unsigned values, a sign bit (with the value of 0) is appended at the Most Significant Bit (MSB) positions of video inputs to the subtract circuit. A 12-bit subtract circuit 57 is used, but only the lower 11 bits of the circuit are required for generating the 11-bit difference value. The MSB position of the subtract circuit is actually used to generate a control signal that indicates whether or not the current difference value output from the subtract circuit and the difference value that was generated on the previous clock cycle have the same sign. To this end, the sign of the difference value output from the subtract circuit is stored in flip-flop 59 for input to the MSB of the subtract circuit on the following clock cycle. The previous difference value is available at the output of register 55, and the add/subtract circuit 53 is employed to compare the relative magnitudes of the current and the previous difference values. When the current and previous difference values have opposite signs, the values are added in the add/subtract circuit. When they have different signs, the previous difference value is subtracted from the current difference value. The add/subtract circuit is used only to determine the relative magnitudes of the two difference values and this is implemented by substituting the value 0 for the MSB of the current difference value into the add/subtract circuit (i.e., regardless of the actual sign of the current difference value). With this modification, the MSB output from the add/subtract circuit indicates the relative magnitudes of the difference values.

For convenience, the signals in FIG. 5 have been labeled to agree with the designations for the samples in FIG. 2 (e.g., with the output of register 525 providing the value of Sample E). Earlier samples are then available in the register pipeline, with Sample D in register 524, Sample C in register 523, and Sample B in register 522. The difference between the values of samples E and D is then available at the output of the subtract circuit 57. The previous difference value (i.e., between samples D and C) is then compared to the current difference value by the add/subtract circuit 53. The MSB of the output from the add/subtract circuit, labeled as CD_GT_DE, is equal to a logical one whenever $|C-D|>|D-E|$. Actually, depending on the signs of the difference values, this signal may be true/active for either the operator ">" or the operator "≧" for this specific embodiment. This control signal is also pipelined so that the output of flip-flop 51 provides the signal labeled BC_GT_CD and the output of flip-flop 52 provides the signal AB_GT_BC. These control signals are then used to select the correct sample for rendering the pixel, according to the local phase adjustment algorithm. For example, when the control signal BC_GT_CD is active/true (i.e., indicating that $|B-C|>|C-D|$), selector 58 outputs the value of Sample D (from register 524). Otherwise, it outputs the value of Sample B (from register 522). Thus, the output of selector 58 will be the sample that is closer in value to Sample C, according to the requirements of the local phase adjustment algorithm. Selector 56 outputs the value of Sample C (from register 523) whenever it is the case that both |A−B|>|B−C| and |D−E|>|C−D|, which indicates that Sample C is not within a video transition region. Otherwise, the output from selector 58 is output by selector 56. The output from selector 56 is then loaded into register 54 to render the pixel according to the requirements of the local phase adjustment algorithm. Register 54 could, optionally, be loaded on every third clock cycle since this is the rate that the pixels are actually rendered. Otherwise, only every third output from register 54 would be used by the next stage of processing. The output of the AND gate 50 is active only when the difference value |C−D| is determined to be a local peak value in the stream of differences values (as for the timing shown in FIG. 2D), and this signal is used by the global phase detection circuit 18.

Figure 6:
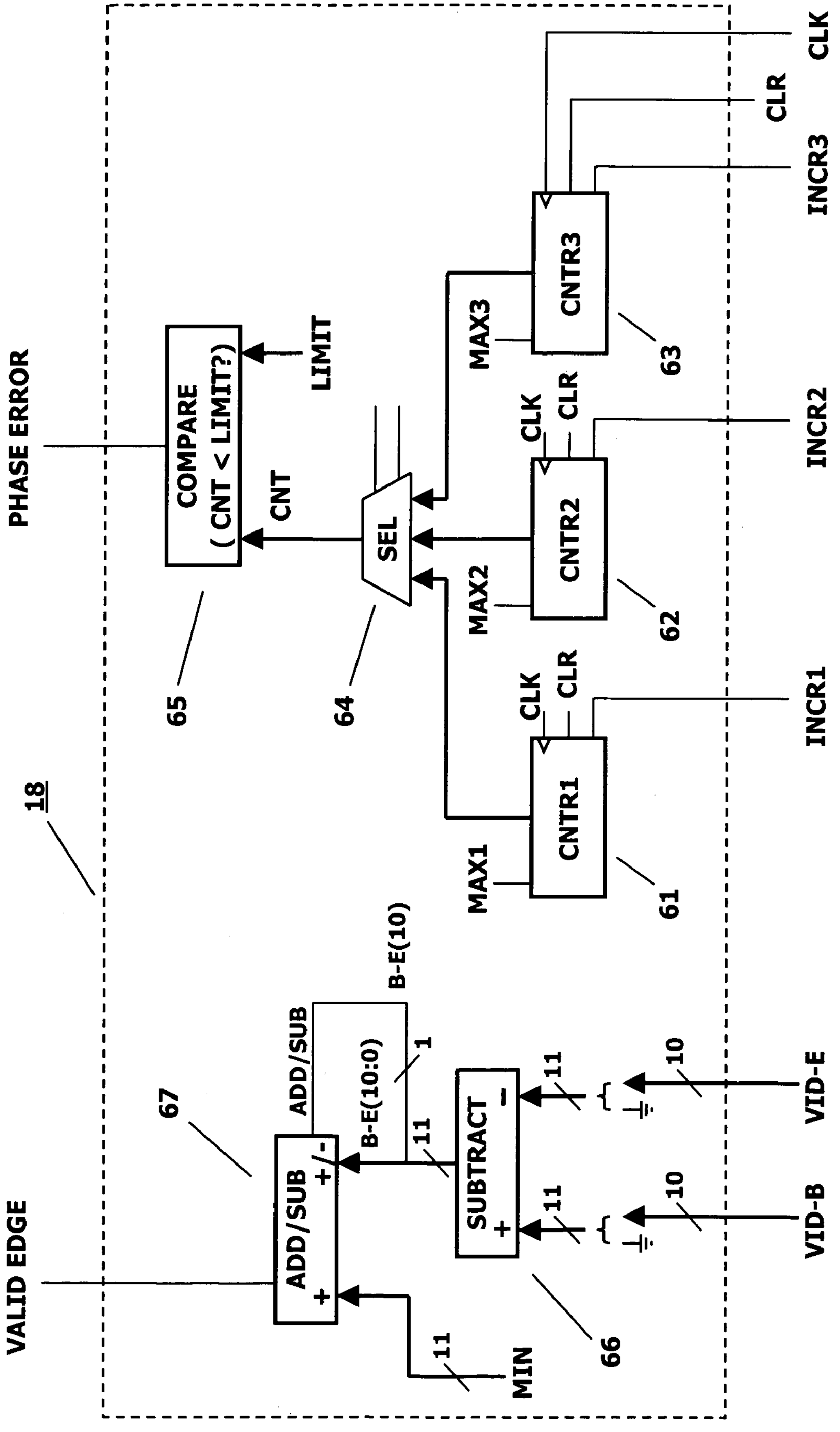
FIG. 6 is a preferred embodiment of a phase detection circuit that is used by the global phase adjustment algorithm.

The global phase detection circuit 18 is shown in detail in FIG. 6. When a local peak in the difference values is detected, the magnitude of the video transition over the full pixel time-period must exceed a threshold value in order to verify that a legitimate transition has been detected and located. The magnitude of the transition is derived from the subtract circuit 66 in FIG. 6, which subtracts the video sample in register 525 of FIG. 5 (corresponding to Sample E) from the sample in register 522 (corresponding to Sample B). Of course, this difference value of (B−E) can be either positive or negative. The magnitude of the difference value is compared to a minimum threshold value by the add/subtract circuit 67. When the difference value is negative it is added to the minimum threshold and when it is positive it is subtracted from the minimum threshold. The sign bit (i.e., the MSB) of the output from the add/subtract circuit 67 then indicates the relative magnitudes of the difference value and the minimum threshold. When the output from the add/subtract circuit is negative, this indicates that the magnitude of the difference value is larger than the required threshold. When this occurs on the same clock cycle that a local peak is detected in the difference values, this indicates that a valid video transition has been detected and located. As previously described, the location of a valid video transition delineates the optimum clock phase for rendering the input pixels of the video signal. For this embodiment, the global phase detection circuit 18 is downstream from the global phase adjustment circuit 16. Therefore, the delay setting of the global phase adjustment circuit must be accounted for in determining the optimum clock phase from the phase of a detected video transition.

The three counters 61, 62, and 63 in the phase detection circuit are used to accumulate the number of times that each of the three available clock phases is detected as being the optimum phase for rendering the pixels. The counters are cleared at the beginning of each phase detection cycle. The first and the last of the detected video transitions in each horizontal line of the video input are then processed and the corresponding counter for the optimum clock phase of each video transition is incremented until one of the counters reaches the maximum count. The counter for the current globally selected clock phase is gated through the selector 64, and this count value is compared to the predetermined limit value by the compare circuit 65. The count value for the current clock phase must be less than this limit value in order for a phase error to be indicated. As previously described, the predetermined limit value determines the amount of hysteresis for changing the globally selected clock phase. When one of the counters reaches the maximum count and a phase error is indicated, the globally selected clock phase is switched to the new optimum phase at the next vertical sync time.

It should be recognized that numerous embodiments are possible for the present invention. For example, many of the details in the previously described embodiments of the local and the global phase adjustment algorithms are specific to the A-to-D sampling rate of three times the input pixel rate. However, the invention is compatible with sampling rates that are other multiples of the input pixel rate. In the described embodiment of the local phase adjustment algorithm, each pixel is rendered with a single sample that is selected from a group of three available samples. A higher sampling rate would make a larger number of samples available to each pixel and this would generally require a modification in the details of the process for selecting a sample that is not within a video transition region. But different embodiments are possible for detecting the locations of possible transition regions. The local phase adjustment algorithm could, for example, use local peaks in the difference values to detect the transition regions, as does the previously described embodiment of the global phase adjustment algorithm. And, of course, different embodiments are also possible for the global phase adjustment algorithm. For example, when the ratio of the sample rate to the input pixel rate is an even integer, it is useful to compare the difference values between pairs of samples that are two clock cycles distant instead of between adjacent samples. A local peak in these difference values resolves the location of a detected video transition to the nearest sample instead of to the nearest midpoint between samples.

The local phase adjustment algorithm could also render each pixel with the average of two or more samples from the A-to-D converter that are selected from a larger group of samples. For example, it could render each pixel with the average of two adjacent samples that are selected from a group comprised of at least three samples, and preferably more than three samples. In general, the local phase adjustment algorithm renders the luminance value for each pixel of the video input from one or more samples of the A-to-D converter and it selects the one or more samples from a larger group of available samples according to a process that avoids the selection of any sample that might be located within a video transition region of the input video signal. As discussed herein, the details for the process of selecting the one or more samples would generally be dependent on the frequency of the sampling clock relative to the input pixel rate.

Although the previously described embodiments comprise circuits for rendering real-time video, the invention can also be used to render individual high-resolution still-images from an analog video interface. In this application, the A-to-D samples for a single frame of the input video signal can first be stored in the memory of a general-purpose computer system in the form of a 2-dimensional array. All of the A-to-D samples that occur during the active video portion of the input are stored so that an integer number of samples are stored for each of the input pixels of the video signal. The phase adjustment algorithms of the present invention can then be implemented in a computer program that renders the pixels of the image. A first processing pass through the stored data would implement the global phase adjustment algorithm by detecting the video transitions in order to determine and select a globally optimum phase for rendering the pixels. This embodiment would again accumulate the number of hits for each available phase, but it would then select the phase that accumulated the largest number of hits. A second processing pass through the stored data would then render the individual pixels of the high-resolution image according to the local phase adjustment algorithm, whereby the globally selected phase would be employed as the nominal phase of the local phase adjustment algorithm.

Of course, the methods of this invention are not restricted to the application of video. They can be used to correctly recover time-sampled data from any analog interface that employs an over-sampled A-to-D converter that is clocked from a PLL that is at least loosely synchronized to the analog input. Moreover, the PLL could be synchronized to the inherent transitions in the analog signal, instead of to a dedicated synchronization signal, as is the normal case for video.

What is claimed is:

1. A circuit that generates a sequence of digital values for a corresponding sequence of analog voltages in each analog signal of an analog input, the analog voltages in each analog signal occurring at an identical fixed rate with a corresponding fixed time-period for each analog voltage level associated with an input pixel, the analog input comprising a minimum of one analog signal, the circuit comprising:

a phase-locked-loop that generates a clock signal synchronized to the analog input with a frequency that is an integer multiple of a rate of input pixels in each analog signal so that an integer number of clock cycles occur over the time-period of each input pixel, said integer number of clock cycles comprising a sequence of clock phases that is repeated for the time-period of each input pixel;

a sampling analog-to-digital converter, for each analog signal, that generates a digital sample for the analog signal at each cycle of the clock signal;

a rendering circuit, for each analog signal, that determines each digital value in the sequence of digital values from at least one sample in a group of samples from the analog-to-digital converter that occur within a time-window that brackets a selected nominal phase of the clock signal; and a local phase adjustment means, for each analog signal, for selecting the at least one sample, wherein the local phase adjustment means locates possible transitions in the voltage level by determining difference values between samples from the analog-to-digital converter that are in close proximity and comparing the relative magnitudes of the difference values to one another and wherein the selection of the at least one sample excludes samples near transitions in the voltage level of the analog signal.

2. The circuit of claim 1 wherein the analog input comprises video input.

3. The circuit of claim 1 wherein the analog input comprises a color video input with a red analog signal, a green analog signal, and a blue analog signal.

4. The circuit of claim 1 wherein the group of samples comprises a minimum of three samples, the at least one sample that is selected by the local phase adjustment means comprises two contiguous samples, and the digital value comprises the value of the average of the two contiguous samples.

5. The circuit of claim 1 wherein the group of samples comprises a minimum of two samples, the at least one sample that is selected by the local phase adjustment means comprises a single sample, and the digital value comprises the value of the single sample.

6. The circuit of claim 5 wherein each of the difference values comprises the difference between two samples that are separated by a distance of two cycles of the clock signal, wherein every other sample is used for generating the difference values, and wherein the group of samples comprises three samples that are employed in generating the difference values.

7. The circuit of claim 5 wherein each of the difference values comprises the difference between two contiguous samples and wherein the group of samples comprises three contiguous samples.

8. The circuit of claim 7 wherein, whenever it is the case that both the magnitude of the difference between the sample at the nominal clock phase and a first adjacent sample is less than the magnitude of the difference between the first adjacent sample and its other neighboring sample and the magnitude of the difference between the sample at the nominal clock phase and a second adjacent sample is less than the magnitude of the difference between the second adjacent sample and its other neighboring sample, then the single sample selected by the local phase adjustment means is the sample at the nominal clock cycle; and, whenever it is the case that the magnitude of the difference between the sample at the nominal clock phase and one of its adjacent samples is greater than the magnitude of the difference between this same adjacent sample and the other neighboring sample to this adjacent sample, then the single sample selected by the local phase adjustment means is the specific adjacent sample to the sample at the nominal clock phase that is closest in value to the sample at the nominal clock phase.

9. The circuit of claim 1, further comprising:

a global phase detection means for locating transitions in the voltage levels of at least one analog signal of the analog input in order to determine an optimum clock phase for each analog signal; and a global phase adjustment means for selecting a signal representing the optimum clock phase of each analog signal, as determined by the global phase detection means, to be the nominal clock phase for the rendering circuit of the analog signal.

10. The circuit of claim 9 wherein the analog input comprises video input.

11. The circuit of claim 9 wherein the analog input comprises a color video input with a red analog signal, a green analog signal, and a blue analog signal.

12. The circuit of claim 9 wherein the global phase detection means periodically determines the optimum clock phase and further comprises:

a set of accumulators for at least one analog signal of the analog input with a specific accumulator corresponding to each one of the available clock phases, a means for clearing the accumulators at the beginning of each determination of the optimum clock phase, a means for detecting the locations of the transitions in the voltage level of the analog signal, and a means for determining the most favorable clock phase for sampling the input voltage levels adjacent to each of the detected transitions and for incrementing the corresponding accumulator until one of the accumulators is equal to a predetermined maximum count.

13. A method for generating a sequence of digital values for a corresponding sequence of analog voltages in each analog signal of an analog input, the analog voltages in each analog signal occurring at an identical fixed rate with a corresponding fixed time-period for each analog voltage level associated with an input pixel, the analog input comprising a minimum of one analog signal, the method comprising the steps of:

generating a clock signal synchronized to the analog input with a frequency that is an integer multiple of a rate of input pixels in each analog signal so that an integer number of clock cycles occur over the time-period of each input pixel, said integer number of clock cycles comprising a sequence of clock phases that is repeated for the time-period of each input pixel;

generating a digital sample for each analog signal at each cycle of the clock signal;

locating possible transitions in the voltage level for each analog signal by determining difference values between samples that are in close proximity and comparing the relative magnitudes of the difference values to one another;

determining each digital value in the sequence of digital values for each analog signal from at least one sample in a group of samples that occur within a time-window that brackets a selected nominal phase of the clock signal; and selecting at least one sample that excludes samples near transitions in the voltage level of the analog signal.

14. A circuit that generates a sequence of digital values for a corresponding sequence of analog voltages in each analog signal of an analog input, the analog voltages in each analog signal occurring at an identical fixed rate with a corresponding fixed time-period for each analog voltage level associated with an input pixel, the analog input comprising a minimum of one analog signal, the circuit comprising:

a phase-locked-loop that generates a clock signal synchronized to the analog input with a frequency that is an integer multiple of a rate of input pixels in each analog signal so that an integer number of clock cycles occur over the time-period of each input pixel, said integer number of clock cycles comprising a sequence of clock phases that is repeated for the time-period of each input pixel;

a sampling analog-to-digital converter, for each analog signal, that generates a digital sample for the analog signal at each cycle of the clock signal;

a rendering circuit, for each analog signal, that determines each digital value in the sequence of digital values from at least one sample in a group of samples clocked according to the digital samples of the analog-to-digital converter that occur within a time-window that brackets a selected nominal phase of the clock signal;

a local phase adjustment means, for each analog signal, for selecting the at least one sample, wherein the local phase adjustment means locates possible transitions in the voltage level by determining difference values between samples from the analog-to-digital converter that are in close proximity and comparing the relative magnitudes of the difference values to one another and wherein the selection of the at least one sample excludes samples near transitions in the voltage level of the analog signal;

a global phase detection means for locating transitions in the voltage levels of at least one analog signal of the analog input in order to determine an optimum clock phase for each analog signal; and a global phase adjustment means for selecting a signal representing the optimum clock phase of each analog signal, as determined by the global phase detection means, to be the nominal clock phase for the rendering circuit of the analog signal.

15. The circuit of claim 14 wherein the analog input comprises video input.

16. The circuit of claim 14 wherein the analog input comprises a color video input with a red analog signal, a green analog signal, and a blue analog signal.

17. The circuit of claim 14 wherein the global phase adjustment means employs hysteresis in changing the nominal clock phase for the rendering circuit of each analog signal in order to limit the frequency of occurrence of changes in the nominal clock phase.

18. The circuit of claim 14 wherein the global phase detection means periodically determines the optimum clock phase and further comprises:

a set of accumulators for at least one analog signal of the analog input with a specific accumulator corresponding to each one of the available clock phases, a means for clearing the accumulators at the beginning of each determination of the optimum clock phase, a means for detecting the locations of the transitions in the voltage level of the analog signal, and a means for determining the most favorable clock phase for sampling the input voltage levels adjacent to each of the detected transitions and for incrementing the corresponding accumulator until one of the accumulators is equal to a predetermined maximum count.

19. The circuit of claim 18 wherein the global phase adjustment means changes the selected nominal clock phase for the rendering circuit of each analog signal to the clock phase corresponding to the accumulator with the maximum count only on the condition that the accumulator corresponding to the currently selected clock phase has a count that is less than a predetermined limit value so that hysteresis is employed in changing the nominal clock phase, whereby the amount of hysteresis is a function of the predetermined limit value.

20. The circuit of claim 14 wherein the global phase detection means periodically determines the optimum clock phase and further comprises:

a means for deriving a sequence of difference values by determining the difference in value for each pair of samples from the sampling analog-to-digital converter that are separated by a specific number of clock cycles;

a means for comparing the magnitudes of all the contiguous difference values;

a means for determining locations of possible transitions in the voltage level by detecting peaks in magnitude in the sequence of difference values;

a means for determining, for each of the possible transitions, the magnitude of the difference between the two samples that are separated by the time-period for a single input voltage level and that bracket the location of the possible transition and for determining if this magnitude is greater than a predetermined minimum value in order to verify that an actual transition has been detected and located; and a means for determining the most favorable clock phase for sampling the input voltage levels adjacent to each of the verified transitions.

21. The circuit of claim 20 wherein the analog input comprises video input and wherein the transitions in the voltage levels of the analog signal of the analog input consist of only the first and the last of the verified transitions in each active video line of the video input.

22. The circuit of claim 21 wherein the video input comprises a color video input with a red analog signal, a green analog signal, and a blue analog signal.

23. A method for generating a sequence of digital values for a corresponding sequence of analog voltages in each analog signal of an analog input, the analog voltages in each analog signal occurring at an identical fixed rate with a corresponding fixed time-period for each analog voltage level associated with an input pixel, the analog input comprising a minimum of one analog signal, the method comprising the steps of:

generating a clock signal synchronized to the analog input with a frequency that is an integer multiple of a rate of input pixels in each analog signal so that an integer number of clock cycles occur over the time-period of each input pixel, said integer number of clock cycles comprising a sequence of clock phases that is repeated for the time-period of each input pixel;

generating a digital sample for each analog signal at each cycle of the clock signal;

locating transitions in the voltage levels of at least one analog signal of the analog input in order to determine an optimum clock phase for each analog signal, wherein the locating step includes determining difference values in voltage levels between samples of the at least one analog signal and comparing the relative magnitudes to one another; and selecting the optimum clock phase of each analog signal to be the nominal clock phase for the rendering circuit of the analog signal.

* * * * *